(12) United States Patent
Davis et al.

(10) Patent No.: US 7,878,907 B2
(45) Date of Patent: Feb. 1, 2011

(54) REAL-TIME HD TV/VIDEO IP STREAMING TO A GAME CONSOLE

(75) Inventors: Jeffrey Davis, Snohomish, WA (US);
Todd Bowra, Redmond, WA (US);
Ashley Speicher, Redmond, WA (US);
Gurpratap Virdi, Bellevue, WA (US);
Vu Nguyen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 547 days.

(21) Appl. No.: 11/128,573

(22) Filed: May 13, 2005

(65) Prior Publication Data

US 2006/0258459 A1    Nov. 16, 2006

(51) Int. Cl.
*A63F 13/12*    (2006.01)
*H04N 7/173*    (2006.01)
(52) U.S. Cl. ............... 463/40; 463/42; 386/123; 725/140; 725/141
(58) Field of Classification Search ............. 463/40–43, 463/1, 30, 31; 386/37, 123, 1, 45, 46, 125, 386/126; 725/72, 74–85, 107, 132–133, 725/139–142, 151–531, 25–31; 370/230, 370/241, 241.1, 245, 252, 232–233, 235; 455/3.05, 3.06; 709/217, 223, 230
See application file for complete search history.

(56) References Cited

U.S. PATENT DOCUMENTS

| 6,396,480 | B1* | 5/2002 | Schindler et al. | 345/169 |
| 6,687,486 | B2* | 2/2004 | Grzeczkowski | 455/3.05 |
| 6,760,772 | B2* | 7/2004 | Zou et al. | 709/230 |
| 7,159,151 | B2* | 1/2007 | Morgan et al. | 714/43 |
| 2002/0142842 | A1* | 10/2002 | Easley et al. | 463/42 |
| 2004/0009815 | A1* | 1/2004 | Zotto et al. | 463/42 |
| 2004/0019876 | A1 | 1/2004 | Dravida et al. | |
| 2005/0060753 | A1 | 3/2005 | Lundblad et al. | |

OTHER PUBLICATIONS

Microsoft. Media Center Extender for Xbox. Aug. 6, 2004. "http://assets.xbox.com/en-us/HardwareManuals/WMCE-Xbox.pdf".*
High-bandwidth Digital Content Protection System, Apr. 22, 2003.*

* cited by examiner

*Primary Examiner*—James S. McClellan
*Assistant Examiner*—Damon Pierce
(74) *Attorney, Agent, or Firm*—Lee & Hayes, PLLC

(57) ABSTRACT

Program code enabling the streaming of HD content in real-time to a game console is stored on a storage medium remote from the game console. The game console executes software that facilitates transfer of the program code from the remote storage medium to the game console. The program code ensures that sufficient bandwidth exists on a network between the game console and a HD tuner, and enables the streaming of HD content in real-time to the game console.

20 Claims, 12 Drawing Sheets

REAL-TIME HD TV/VIDEO IP STREAMING TO A GAME CONSOLE

TECHNICAL FIELD

This invention relates to console-based gaming systems, and more particularly, to streaming HD TV/Video IP to console-based gaming systems.

BACKGROUND

Video game consoles, such as the Xbox® game console marketed by the Microsoft Corporation of Redmond, Wash., have been widely proliferated and are found in many households. Often, a single home may have multiple game consoles dispersed throughout, such that single individuals may separately play their own games of choice or, alternately, they may elect to compete with other individuals by connecting the dispersed game consoles via a home network.

Traditionally, game consoles have been low cost devices embodying specialized hardware for rendering audio, and as two or three dimensional graphics. In the past, game consoles have focused on entertainment scenarios in which all rich media content was found either in built-in storage, such as ROM/flash, or hard drives, or it was introduced on portable storage media such as DVDs or CDs. One exception to this is the Media Center Extender for the Xbox® game console marketed by the Microsoft Corporation, which facilitates the streaming of live television or video over an IP network to a game console from a personal computer. Though quite useful for Standard Definition (SD) content, the Media Center Extender does not support streaming High Definition (HD) content to a game console.

Thus, there exists a need to enable a game console to receive real-time streaming HD content.

SUMMARY

Real-time streaming of high definition (HD) content to a game console is described. In one configuration, program code that enables streaming of HD content in real-time to a game console is stored on a storage medium remote from the game console. The game console executes software to load the program code from the remote storage medium. Once loaded, the program code ensures that sufficient bandwidth exists on a network between the game console and an HD tuner. HD content can then be delivered in real-time to the game console.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Home Environment

Figure 1:
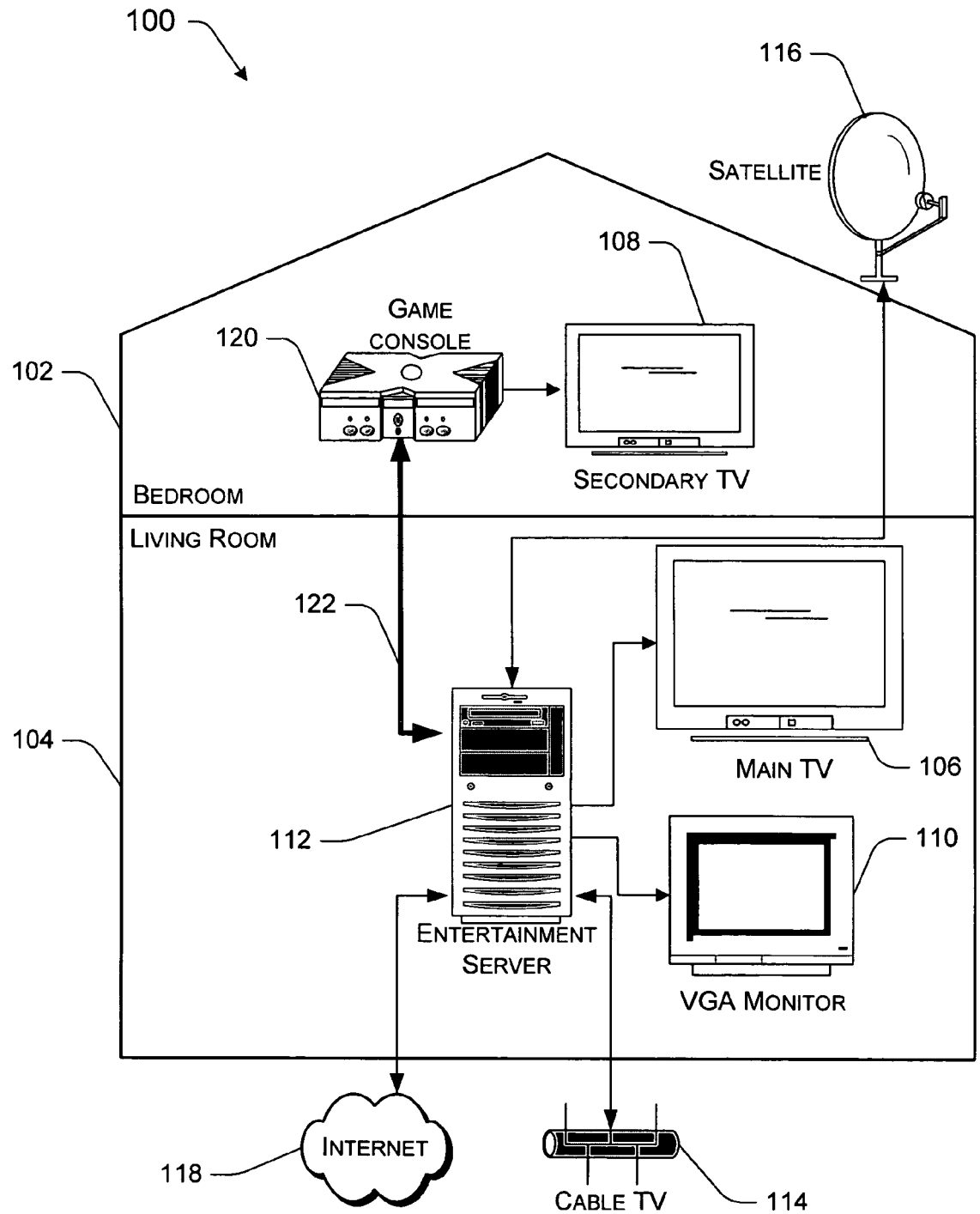
FIG. 1 illustrates an exemplary home environment including a game console and entertainment server.

FIG. 1 shows an exemplary home environment 100 comprising a bedroom 102 and a living room 104. Situated throughout the home environment 100 are a plurality of monitors, such as a main TV 106, a secondary TV 108, and a VGA monitor 110. Content may be supplied to each of the monitors 106, 108, 110 over a home network from an entertainment server 112 situated in the living room 104. In one implementation, the entertainment server 112 is a conventional personal computer (PC) configured to run a multimedia software package, such as, for example, the Windows® XP Media Center™ edition operating system marketed by the Microsoft Corporation. In such a configuration, the entertainment server 112 is able to integrate full computing functionality with a complete home entertainment system into a single PC. For instance, a user can watch TV in one graphical window of one of the monitors 106, 108, 110 while sending email or working on a spreadsheet in another graphical window on the same monitor. In addition, the entertainment system may also include other features, such as, for example:

A Personal Video Recorder (PVR) to capture live TV shows for future viewing or to record the future broadcast of a single program or series.

DVD playback.

An integrated view of the user's recorded content, such as TV shows, songs, pictures, and home videos.

A 14-day EPG (Electronic Program Guide).

In addition to being a conventional PC, the entertainment server 112 could also comprise a variety of other computing devices including, for example, a notebook computer, a tablet PC, a server, or any consumer-electronics device capable of rendering a media component.

With the entertainment server 112, a user can watch and control live television received, for example, via cable 114, satellite 116 and/or an antenna (not shown for the sake of graphic clarity), and/or a network such as the Internet 118. This capability is enabled by a tuner residing in the entertainment server 112. It will also be understood, however, that the tuner may be located remote from the entertainment server 112 as well. In both cases, the user may choose a tuner to fit any particular preferences. For example, a user wishing to watch both standard and HD content should employ a tuner configured for both types of contents.

Since the entertainment server 112 may be a full function computer running an operating system, the user may also have the option to run standard computer programs (word processing, spreadsheets, etc.), send and receive emails, browse the Internet, or perform other common functions.

The home environment 100 also includes a game console 120 placed in communication with the entertainment server 112 through a coupling 122. In a particular embodiment, the game console may be an Xbox® game system marketed by the Microsoft Corporation. The terms game console and console-based gaming system used herein refer not only to commercially offered gaming products such as the Xbox® game console marketed by the Microsoft Corporation, but also to any electronic device capable of rendering a media component, such as, for example, a conventional personal computer, a notebook computer, a tablet PC, or a server. The coupling 122 may comprise a wire, wireless network, or any other electronic coupling means. It will be understood that the coupling 122 may enable communication between the game console 120 and the entertainment server 112 through packet-based communication protocols, such as, for example, Transmission Control Protocol (TCP) and Internet Protocol (IP). The game console 120 may also be coupled to the secondary TV 108 thorough wireless means or conventional cables.

The game console 120 may be configured to receive a user experience stream as well as a compressed, digital audio/video stream from the entertainment server 112. The user experience stream may be delivered in a variety of ways, including, for example, Standard Remote Desktop Protocol (RDP), Graphics Device Interface (GDI), or Hyper Text Markup Language (HTML). The digital audio/video stream may comprise video IP, Standard Definition (SD), and HD content, including video, audio and image files, decoded on the game console 120 and then "mixed" with the user experience stream for output on the secondary TV 108. In one exemplary embodiment, HD content includes video having a resolution of 1280×720 pixels in a progressive format. In another exemplary embodiment, HD content includes video having a resolution of 1920×1080 pixels in an interlaced format. In yet another exemplary embodiment, HD content includes video having a resolution of 1920×1080 pixels in a progressive format In FIG. 1, only a single game console 120 is shown. It will be understood, however, that a plurality of game consoles 120 and corresponding displays may be dispersed throughout the home environment 100, with each game console 120 being communicatively coupled to the entertainment server 112.

Game Console Configuration System

Figure 2:
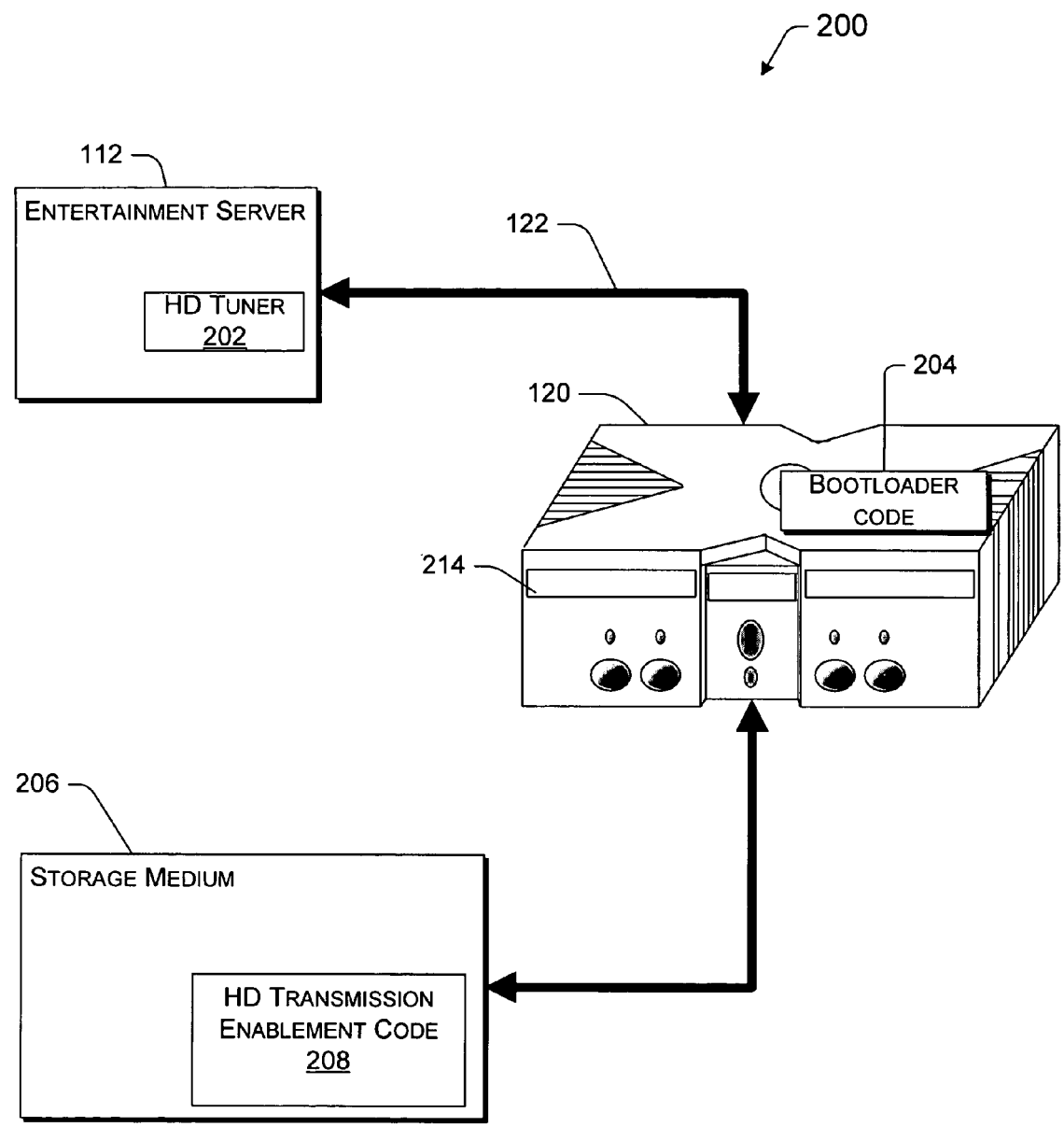
FIG. 2 shows an exemplary architecture for enabling the game console to receive HD content that is streamed real-time.

FIG. 2 shows, at a high level, an exemplary architecture 200 to configure a game console to handle HD content. The architecture has the game console 120 with bootloader program code 204 residing thereon. A tuner 202, along with the entertainment server 112 on which it is hosted, are communicatively coupled to the game console 120 via coupling 122. It will be understood, however, that the tuner 202 need not necessarily be hosted on the entertainment server 112, as it may reside by itself, or on another device communicatively coupled to either the entertainment server 112 or the game console 120. The tuner 202 is capable of tuning to and receiving HD content.

The game console 120 is also communicatively coupled to a storage medium 206 on which HD transmission enablement program code 208 is stored. The storage medium 206 may be embodied as any storage media capable of storing computer readable program code, including, for example, Read Only Memory (ROM), Random Access Memory (RAM) or any other storage media known in the art. The storage medium 206 could be part of, for example, a standard PC, a notebook PC, a server, or even another game console. It will also be understood that the storage medium 206 may also comprise portable media, such as optical storage media (including, for example, DVDs, CD-ROM or game discs) which may be placed in an optical disc reader 214 on the game console 120, along with game cartridges and other portable storage devices such as USB flash drives, or dongles.

In operation, once the game console 120 is coupled to the storage medium 206, the bootloader program code 204 may call the HD transmission enablement program code 208 and load it onto the game console. When executed, the HD transmission enablement program code 208 reconfigures the game console 120, enabling the tuner 202 to stream HD content to the game console 120 in real-time with full media transport functionality (i.e. the user is afforded functions such as FWD, RWD, skip, pause, play, etc). In one embodiment, the bootloader program code 204 causes the HD transmission enablement program code 208 to be stored on the game console 120. In other implementations, the bootloader program code 204 loads the HD transmission enablement program code 208 each time HD content is played.

It will also be understood that the HD transmission enablement program code 208 may be preloaded onto the game console 120 in a manner not involving the bootloader program code 208. For example, the HD transmission enablement program code 208 may be burned into ROM inside the game console 120. In this way, the need for bootloader program code 208 on the game console 120 in order to call the HD transmission enablement program code 208 may be obviated.

Software Functionality

Figure 3:
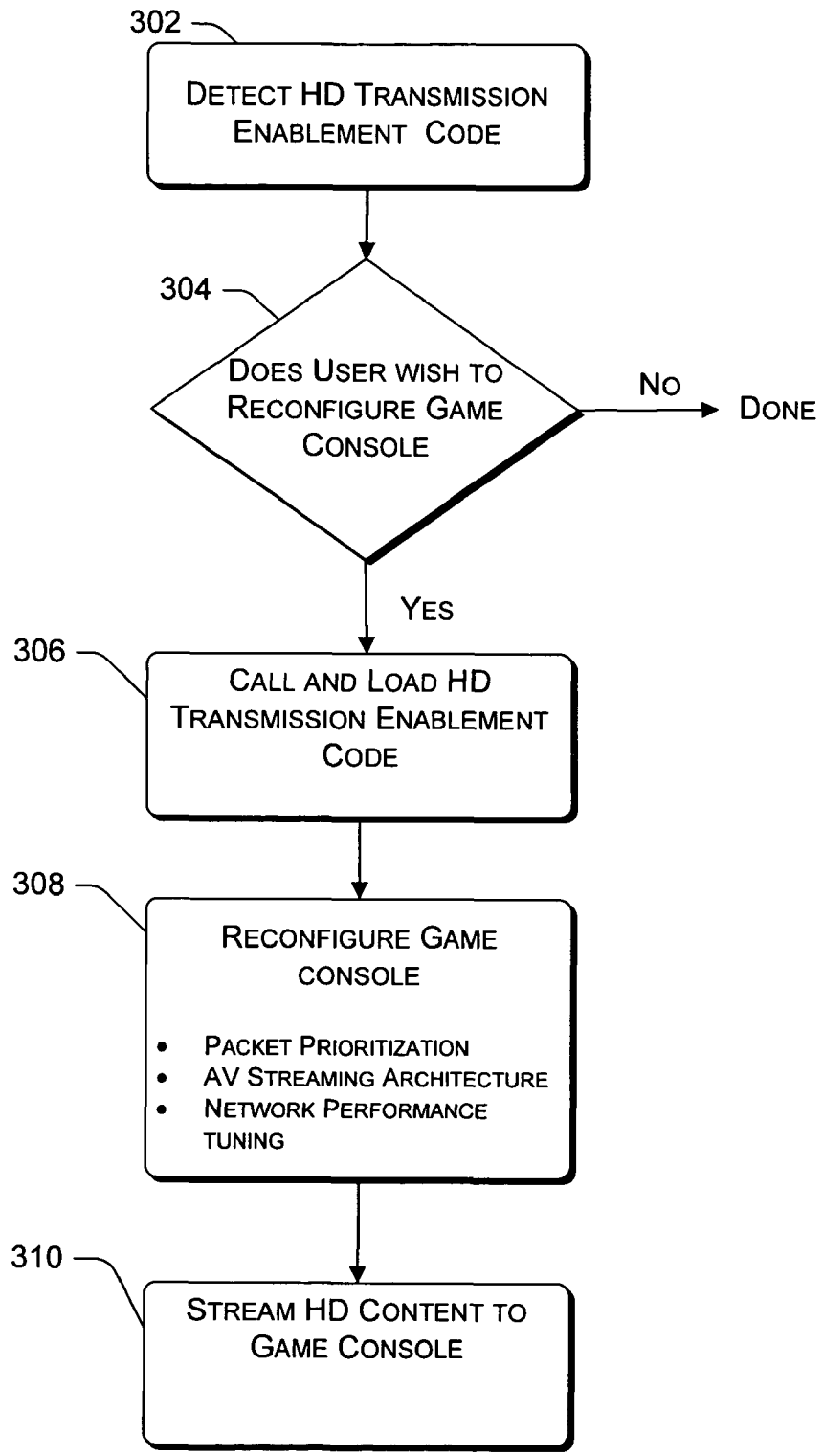
FIG. 3 is a flow diagram illustrating the reconfiguration process of a game console to receive streaming HD content.

FIG. 3 shows an exemplary startup process 300 for initiating the streaming of HD content to the game console 120. The process 300 will be described with reference to select elements of both the home environment 100 discussed in FIG. 1 and the architecture 200 discussed in FIG. 2, although it is noted that the process may be implemented by other systems and architectures.

At a block 302, the HD transmission enablement program code 208 is detected. In the FIG. 2 architecture, the bootloader program code 204 detects the HD transmission enablement program code 208 and triggers an alert which is presented to the user either on a display connected directly to the game console 120, such as the secondary TV 108, or on a display connected to the entertainment server 112, such as the VGA monitor 110 or the main TV 106. The alert can convey that reconfiguration of the game console will begin automatically without requiring a response from the user, or as shown at block 304, the user can be given a choice whether or not to proceed with the reconfiguration. In one embodiment, the user can either accept or reject the offer to reconfigure the game console 120 using controls, such as, for example, game controllers or remote control devices, communicatively coupled directly to the game console 120. Alternately, the user can answer the prompt via I/O devices communicatively coupled to the entertainment server 112. If the entertainment server 112 being used is running the Windows® XP Media Center™ Edition operating system, the alert issued to the user could be embodied as a button saying "launch media center".

If the user rejects the prompt, and opts to not have the game console 120 reconfigured (i.e. the "No" branch from block 304), process 300 ends and the game console 120 reverts back its regular function. Alternately, if the user accepts the offer issued by the prompt to reconfigure the game console 120 (i.e. the "Yes" branch from block 304), the bootloader program code 204 calls and loads the HD transmission enablement program code 208 (block 306). Once loaded, the HD transmission enablement program code begins the reconfiguration of the game console 120 to receive streaming HD content in real-time with full media transport functionality (block 308). This reconfiguration process may include the instantiation of admission control and quality of service (QoS) packet tagging procedures that prioritize packets carrying media content—including HD audio and video content—to a level above that of packets carrying other information across the network such as, for example, files being copied to the entertainment server 112. This is done to avoid signal break up or jerkiness in audio or video streams being streamed to the game console 120 from the tuner 202. The details of creating such admission control and QoS tagging procedures are well-known by those skilled in the art, and a multitude of these procedures exist which can be used successfully in block 308 to enable the desired admission control and QoS tagging functionality. In the instant example, the program code used to implement the receiver side aspects of admission control and QoS tagging procedures resides in the HD transmission enablement program code, and is called, loaded, and activated by the bootloader program code.

Another aspect of reconfiguring the game console 120 which occurs at block 308 is the reconfiguration of the game console to handle streaming HD content in real time with full media transport functionality. The program code resides in the HD transmission enablement program code and is called, loaded, and activated by the bootloader program code. This portion of the reconfiguration 2 process will be discussed in more detail with regard to FIG. 4 below.

Yet another aspect of reconfiguring the game console 120 at block 308 comprises the running of a network performance tuning program to evaluate the network (depicted as coupling 122 in FIGS. 1 and 2) coupling the game console 120 to the tuner 202. This program, which will be discussed in more detail in conjunction with FIGS. 5-12 below, alerts the user as to the adequacy of the network to receive HD content. Such network bandwidth adequacy alerts may be presented to the user either on a display connected directly to the game console 120, such as the secondary TV 108, or on a display connected to the entertainment server 112, such as the VGA monitor 110 or the main TV 106. Moreover, the network performing tuning program may be run on the game console 120, the entertainment server 112, or any other electronic device in communication with the game console 120. In the event the network is found to be inadequate, the program offers the user advice on how to tune the network in order to increase the available bandwidth of the network to a level where HD content can be streamed across it. The network tuning performance program may be located in either the bootloader program code or the HD transmission enablement program code.

Once the network is deemed adequate to accommodate the streaming of HD content, HD content may be streamed in real-time with full media transport functionality from the tuner 202 to the game console 120 (block 310).

It is important to note that throughout the exemplary startup process 300, the user need not be given any indication of where the varying program codes reside. In fact, from the vantage point of the user, it may appear as though all of the necessary reconfiguration program code resides on the game console 120 itself. In this way, the exemplary startup process 300 optimizes user enjoyment by making the entire configuration process simple and quick.

Reconfiguring the Game Console

Implementing AV Streaming Architecture

Figure 4:
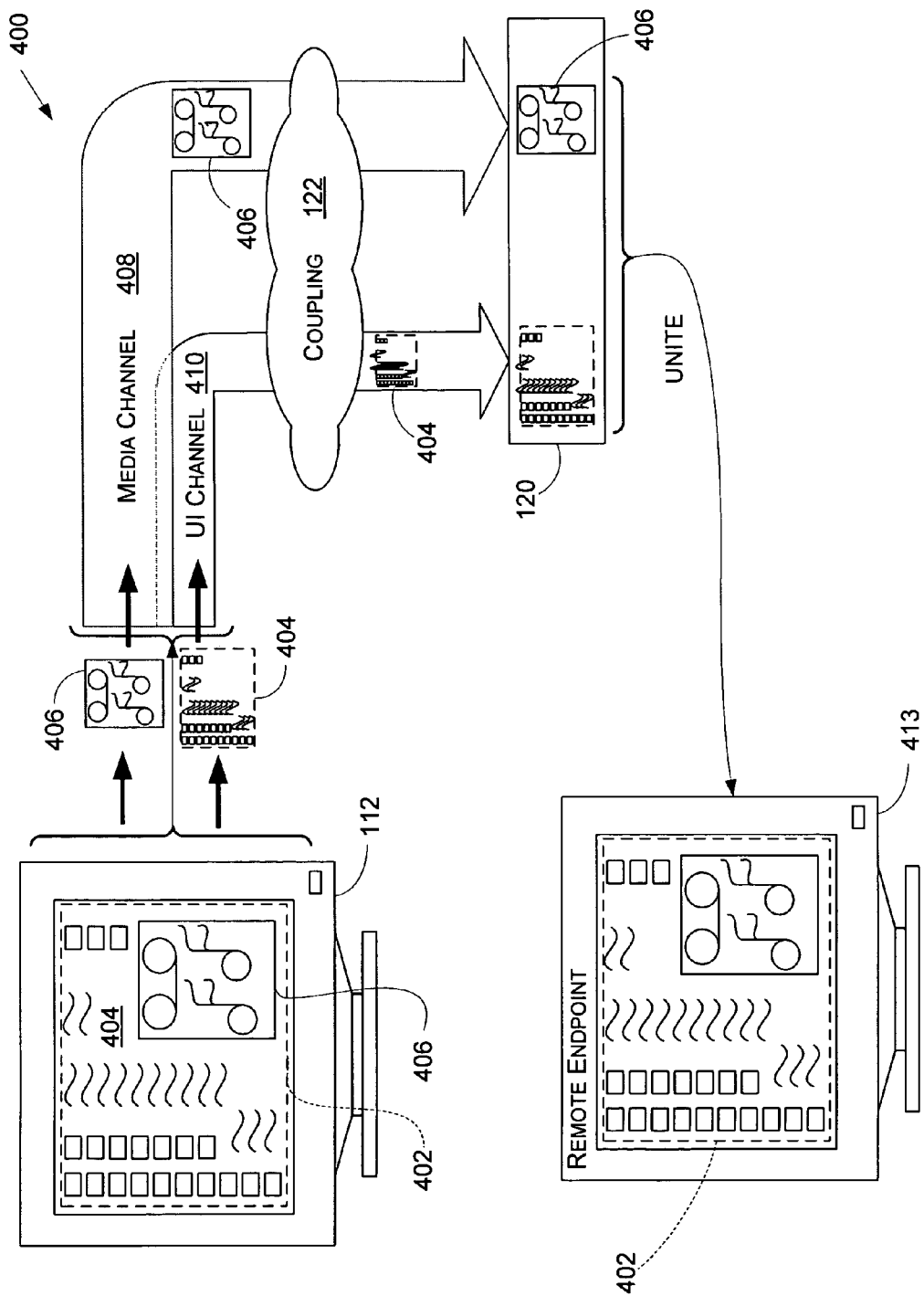
FIG. 4 is a block diagram illustrating a high-level overview of the functionality of a game console receiving streaming HD content.

FIG. 4 provides a high-level overview of an exemplary operating environment 400 for streaming a HD content 402, which includes a user-interface component 404 and a media component 406, from the entertainment server 112 to the game console 120. To transmit the HD content 402, the user interface 404 is communicated through a user-interface channel 410 and the media component(s) 406 are communicated through a media channel 408 via coupling 122. The game console 120 receives the user-interface component 404 and the media component 406 through their respective channels. The media and user-interface component are composited to render the HD content 402 on a remote endpoint 413 (which corresponds to the secondary TV 108 in FIG. 1).

Using the entertainment server 112 enables a digital rights management (DRM) scheme to be applied to the distributed media presentations. In one aspect, DRM secures and encrypts transmitted media to help prevent unauthorized copying. In another aspect, DRM includes protecting, describing, identifying, trading, monitoring, and/or tracking a variety of forms of media rights usages. DRM can be used to manage all rights, even beyond rights associated with permissions of digital-content distribution. An exemplary DRM implementation is described in the nonprovisional application entitled "Digital rights management operating system," U.S. Pat. No. 6,330,670, filed on Dec. 11, 2001, by England, et al., and commonly assigned to the assignee of the present invention, and is incorporated herein by reference.

In one embodiment, the HD content 402 is a media experience that would be observed locally at the entertainment server 112. However, it will be understood that the HD content 402 is not limited to a single instantiation. Rather, multiple contents 402 that can each be instantiated and received by respective endpoints may exist.

The user-interface component 404 includes HD graphics and images that typically compose a user interface. User-interface component 404 also may include icons, host audio, background images and applications such as word-processing applications, spreadsheet applications, database applications, and so forth. Virtually any components that are not media components are part of the user-interface component 404.

The media component 406 includes media-rich or bandwidth-intensive elements that compose a media event. The following is a nonexhaustive list of exemplary media components: a streaming media presentation, including a HD video and/or audio presentation; a HD television program, including a cable television (CATV), satellite, pay-per-view, or broadcast program; a HD digitally compressed media experience; a radio program; a HD recorded media event (sourced by a VCR, DVD player, CD player, Personal Video Recorder and the like); a HD real-time media event; and a HD camera feed.

Thus, a user with the entertainment server 112 could watch a streaming video program from the Internet on a television (such as main TV 106 in FIG. 1) in one room, while allowing a child to simultaneously watch other HD content on a secondary TV (e.g. secondary TV 108 in FIG. 1) through the game console 120.

Those skilled in the art will appreciate that these scenarios can be extended to a myriad of circumstances. A third user could simultaneously observe a camera feed input into the entertainment server 112 that is remoted to a third remote endpoint. A fourth user could use entertainment server 112 to remote a fourth instantiation of HD content 402 to watch a remoted television program on a monitor that does not have a TV tuner.

In each of the scenarios mentioned above, user-interface component 404 is presented on the respective remote endpoint along with media component 406. This enables a remote user to remotely operate the entertainment server 112 and initiate commands such as stop, fast forward, and rewind as well as conventional computer commands that enable actions such as resizing replay windows and adjusting volume and picture quality.

User-interface channel 410 communicates user-interface component 404 to the game console 120. Terminal Server and Terminal Client Services, offered by Microsoft Corporation of Redmond, Wash., provide an exemplary user-interface channel 410. Any remotable protocol can be used to transmit data through user-interface channel 410. Exemplary protocols include the T-120 series protocol or HTML (hypertext markup language and its many variations).

Media channel 408 is separate from user-interface channel 410. Media channel 408 is used to transmit bandwidth-intensive experiences such as video and others listed above. Media component 406 provides a communications conduit for data to flow separate from user-interface component 404. Thus, the media component 406 is sent out of band with respect to the user-interface component, but synchronized. An exemplary protocol to transmit data through media component 406 includes, but is not limited to, the Transmission Control Protocol (TCP).

Coupling 122 can be any computing/communications network but is described in the context of a local area network (LAN). Today, LANs are offered in many varieties, including Ethernet, phone-wire networks, power-wire networks, and wireless networks. Wireless networks are not limited to radio and spread-spectrum networks and utilize protocols such as 802.11a, 802.11b, and 802.11g. An ordinary skilled artisan will readily appreciate these and other networks, all of which may comprise the coupling 122.

In addition to the AV streaming architecture discussed above, any other suitable architecture known in the art may be used. This includes the architectures discussed in the nonprovisional application entitled "UI Remoting With Synchronized Out-Of-Band Media", Ser. No. 10/413,846, filed on Apr. 15, 2003, by Davis et al., and commonly assigned to the assignee of the present invention, which is incorporated herein by reference.

Network Performance Tuning

Figure 5:
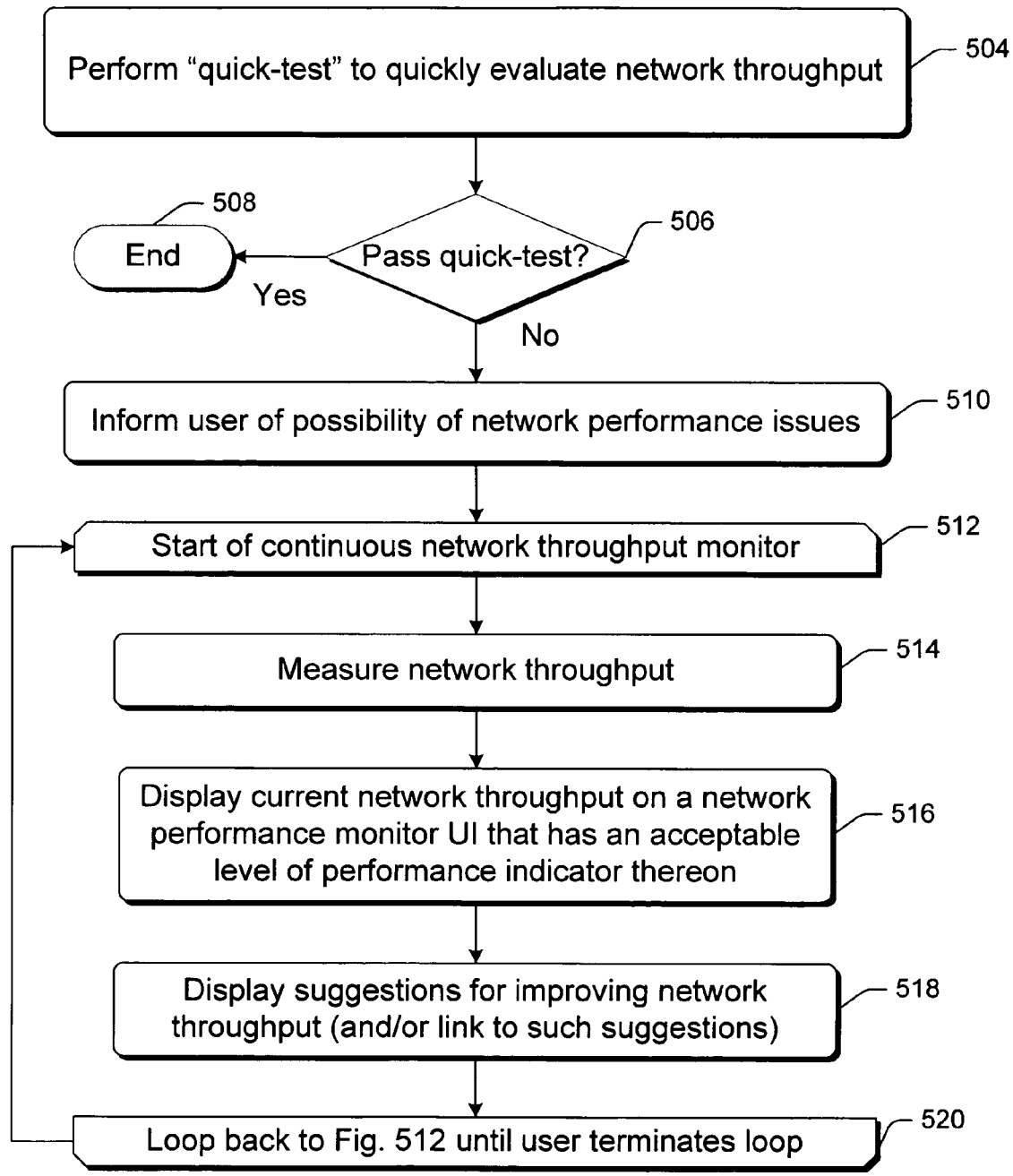
FIG. 5 is a flow diagram illustrating a methodological implementation of a network performance tuning program.

Another aspect of reconfiguring the game console 120 is shown in FIG. 5 which illustrates an exemplary method 500 performed by a network performance tuning program. For ease of understanding, the method 500 is delineated as separate steps represented as independent blocks in FIG. 5; however, these separately delineated steps should not be construed as necessarily order dependent in their performance. Additionally, for discussion purposes, the method 500 is described with reference to elements in FIGS. 1-3.

At a block 504, a quick-test is performed to rapidly (e.g., 20-30 seconds) evaluate the available bandwidth of the network coupling the game console 120 to the tuner 202. If the quick-test determines that the network's bandwidth is sufficient to support the real-time streaming of HD content with full media transport functionality, then the method 500 terminates at a block 508.

Alternately, if the quick-test determines that the network bandwidth is insufficient to support the real-time streaming of HD content with full media transport functionality, the method 500 proceeds to a block 510 where the user is informed of the possibility of network performance issues. This alert may be issued to the user either on a monitor connected directly to the game console 120, such as the secondary TV 108, or on a monitor connected to the entertainment server 112, such as the VGA monitor 110 or the main TV 106.

At this point, the method 500 may also issue a corrective action suggestion comprising a static document that lists some suggested actions that the user may take to improve network throughput. This static document may be stored on the tuner 202, the entertainment server 112, the game console 120, the storage medium 206, or any accessible source (e.g., via the Internet). Alternately, instead of displaying a static document, a link to an updatable document located on any accessible source (e.g., via the Internet) may be issued to the user. Moreover, the suggestion mechanism may dynamically generate a list of suggested actions from one or more sources (including, for example, websites on the Internet). This list might include, for example:

Move one or more wireless access points (WAPs). Moving the WAP just six inches can make an appreciable difference. If possible, it may be helpful to move a WAP to a different room.

Reorient antenna on the one or more WAPs.

Change network topology. For example, modifying the components and/or fundamental structure of the network changes the network topology.

Switch to a different wireless network band if possible. For example, one suggestion might be to change from the popular and inexpensive Wireless-B (IEEE 802.11b) equipment to the newer and, almost five times faster, Wireless-G (IEEE 802.11g) equipment.

Change to a different channel within the band. Each wireless network band offers multiple channels. Some may perform better than others.

Move obstructions in the path of any two wireless components.

Adjust interfering items such as microwave ovens or competing wireless networks producing interference waves.

In the realm of personal computers, an implementation may employ a software user-interface tool to interrogate a user. Such tools may be called a "wizard" and may be used to ask the user questions about things that could affect network performance in an effort to narrow down the list of possible corrective action suggestions.

The information produced by the wizard may aid or direct the suggestion mechanism when it dynamically generates a list of suggested actions from one or more sources. For example, the wizard might initially ask the user if they have an 802.11g or 802.11a wireless network. Based upon the user's responses, the suggestion mechanism would know that some suggestions would apply and others would not.

Furthermore, additional detection software or mechanisms could be employed to automatically discover information, properties, and characteristics about the network (without interrogating a user). The suggestion mechanism could tailor its suggestions based, at least in part, on these automatically discovered information, properties, and characteristics about the network. For example, detection software may detect that a user is running on an 802.11g network and that the wireless networking "channel" chosen is conflicting with a nearby wireless network. In such an instance, the suggestion mechanism could issue the user a very pointed suggestion about changing their wireless networking channel to another channel where no interference is detected.

Based upon the present network-bandwidth as measured by the quick-test at block 504, a network-bandwidth monitor could generate one or more user-interfaces (UIs) on a display connected directly to the game console 120, such as the secondary TV 108, or on a display connected to the entertainment server 112, such as the VGA monitor 110 or the main TV 106. The generated UI could present the list provided by the suggestion mechanism and graphically represent the network-bandwidth as measured by the quick-test. Examples of UIs that could be presented by the network-bandwidth monitor will be discussed in more detail below in conjunction with FIGS. 6 and 7.

Still referring to FIG. 5, after notifying a user of possible network inadequacy—and perhaps offering suggestions to ameliorate the inadequacy at block 510—the method 500 continues to blocks 512-520 which comprise a loop that is performed until the user terminates the loop or some other trigger event (i.e., a timeout or adequate bandwidth is achieved) occurs.

At a block 514, the tuner measures network throughput. This is displayed at a block 516 via a network performance monitor UI. Such UIs offer a simplified view to limit end-user confusion by providing users with graphic, easy to understand feedback.

Figure 6:
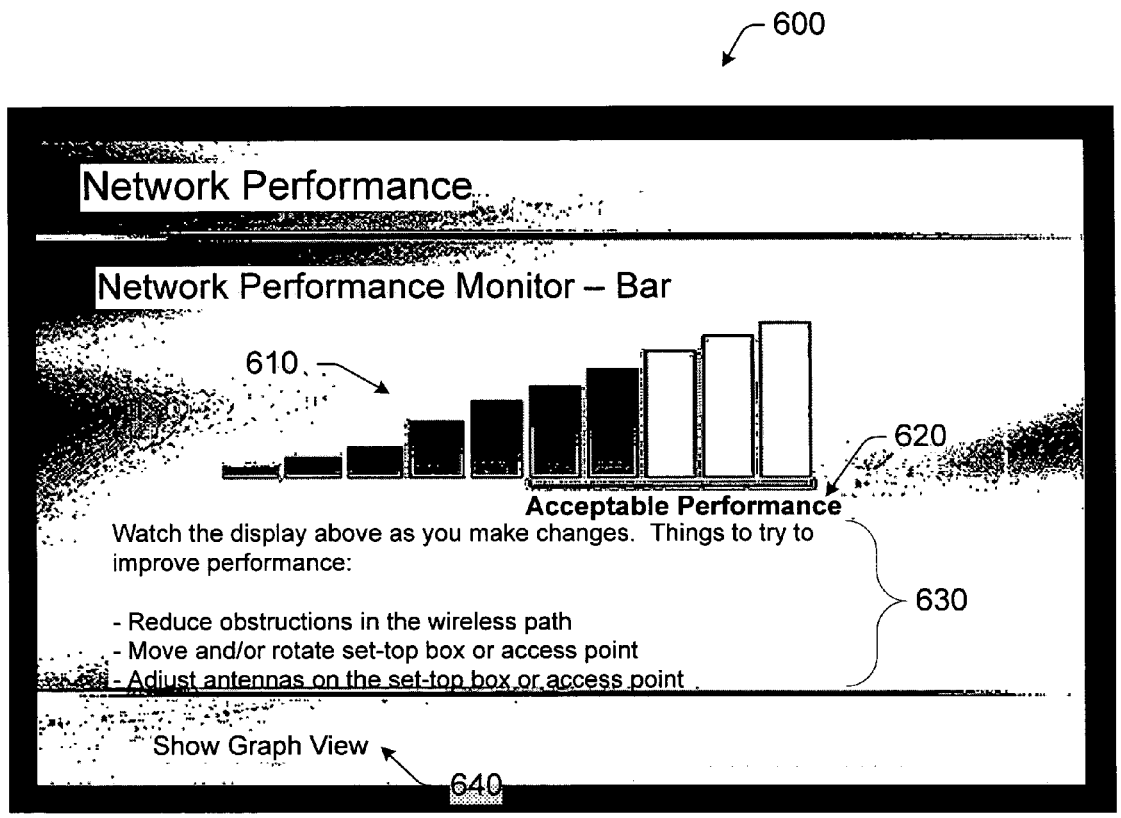
FIGS. 6 and 7 illustrate examples of a user interface detailing bandwidth performance.

For example, as shown in FIG. 6, the measured network throughput may be presented in a UI 600 in the form of a bar-graph monitor 610. Here, when the dark bars reach the area 620 labeled "Acceptable Performance" the user knows that the network has reached a level of available bandwidth adequate to facilitate the desired streaming of HD content.

Figure 7:
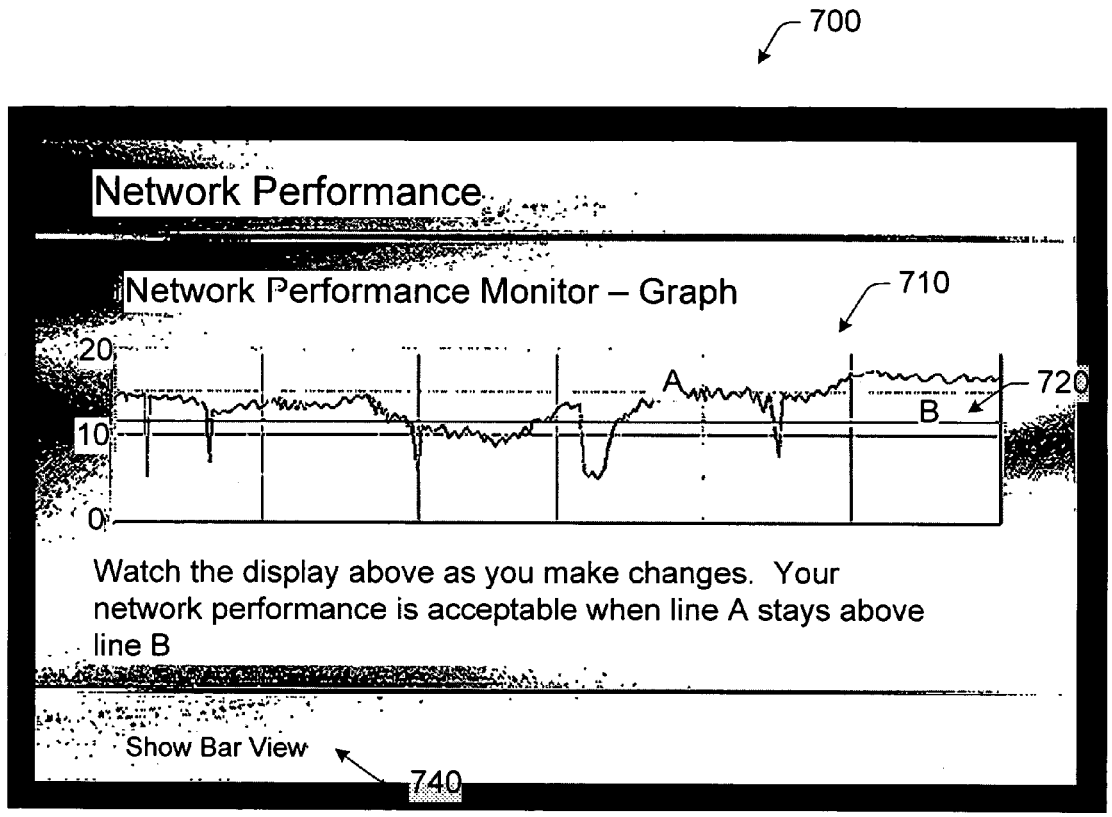

FIG. 7 illustrates another possible UI 700, which provides an alternate presentation of the network throughput. The UI 700 is an example of an easily accessible, detailed view showing valuable historical throughput information as a line graph. This UI also has an "acceptable performance" target line, which is shown at 720 in UI 700.

It may also be possible for the user to toggle between the two UIs 600, 700. FIG. 6 shows a clickable button 640 that allows for easy access to the detailed view of UI 700. Similarly, FIG. 7 shows a clickable button 740 that allows for easy access to the simplified summary view of UI 600.

In yet another possible embodiment, the network-performance tuner could also include an audio UI throughput indicator. In such an embodiment an audio signal could indicate a relative degree of throughput. That way, a user could "hear" the available bandwidth from another room when the user is unable to see the screen displaying the bars or the graph. For example if a user was making very minor tweaks to the position of their wireless networking components' antennas they might be doing so in a completely isolated room of the house. In such case, instead of making very minor tweaks over-and-over then running back to the display to see how the last modification affected performance if they could just turn the volume up loud on the device that was running the performance tuner then ideally it would make a different sound when they were in the "acceptable" range. In such a scenario, the user could concentrate their efforts solely on tweaking the components, stopping only when the sound indicates they are in the "acceptable" range.

Returning to FIG. 5, it will be understood that the network throughput measurement of block 514 and the display of that throughput via a UI of block 516 may occur concurrently.

At a block 518, a list of suggestions, similar to the corrective action suggestions issued at block 510, may be displayed to the user offering suggestions for the improvement of network throughput. By following these suggestions, the user may attempt to complete alterations to increase the available network bandwidth.

At a block 520, the process loops back to block 512. The looping continues until the user terminates the loop or some other trigger (i.e., timeout or enough network bandwidth has been achieved) occurs.

It will also be understood that after the game console 120 has been successfully reconfigured, a network tuner performance program loop similar to blocks 512-520 in FIG. 5 may run in the background while the game console 120 is in use. Since both the bootloader program code 204 and the HD transmission enablement program code 208 may be loaded onto the game console during the reconfiguration, all of the program code necessary to maintain this loop may be run exclusively on the game console 120. In the event that network conditions change, and the network bandwidth becomes inadequate to successfully transmit HD content, alerts may be issued to the user on any of a multitude of displays, including those connected to the game console 120 and the entertainment server 112. Moreover, as discussed above in conjunction with the loop of blocks 512-520, recommendations and suggestions may be issued to the user instructing them how to reconfigure their network to increase the available bandwidth. Due to changing conditions, such as appliances like microwaves that weren't turned on during the initial reconfiguration of the game console 120, or neighboring wireless networks which may interfere intermittently with a network, a continuous network tuning performance program loop can be quite valuable in improving the overall user experience.

Further exemplary methods which may be performed by a network performance tuning program are shown in FIGS. 8-14. For discussion purposes, these methods are described with reference to elements found in FIGS. 1-3.

Figure 8:
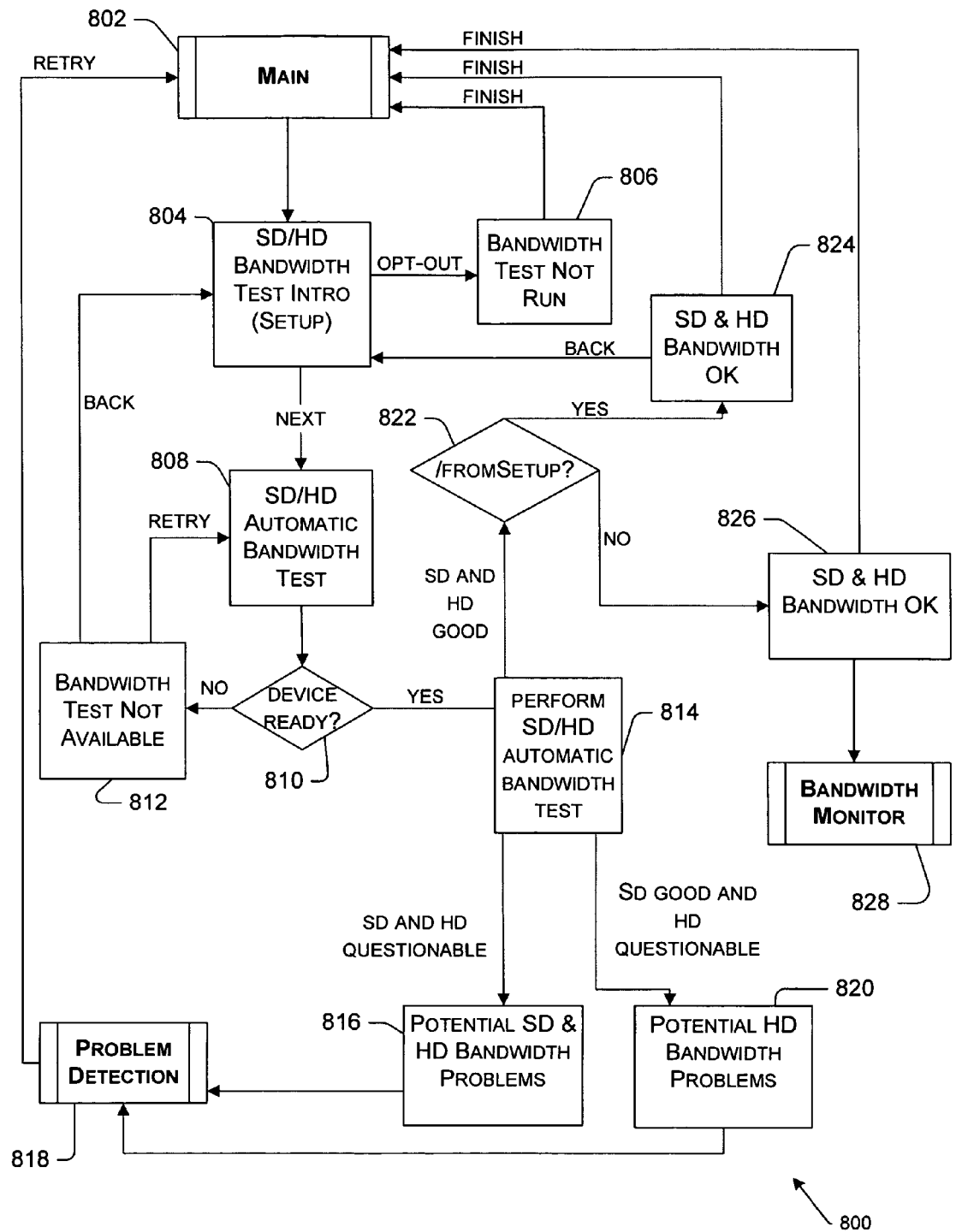
FIG. 8 is a flow diagram of an automatic standard definition and high definition bandwidth test.

FIG. 8 illustrates an automatic SD and HD bandwidth test 800 which is fed from a main module 802. At a block 804, the bandwidth test 800 provides a user with a bandwidth test Introduction. If the user decides to opt out, the bandwidth test 800 is discontinued at a block 806 and the test 800 returns to the main module at block 802. Alternately, if the user decides to continue, the test 800 moves to a block 808 where the network is examined at a block 810. If the network is not ready (i.e. turned off, disconnected) then at a block 812 it is recognized that the test 800 cannot be fully carried out and the test 800 may return to block 804 and give the user another chance to opt out of the test, or it can return to block 808 and recheck the network for readiness. If, however, the network is ready at block 810, then the test 800 may evaluates the bandwidth of the network at a block 814. If this evaluation finds that the network has questionable ability to handle SD and HD content, then it is recognized at a block 816 that the network has problems. The test 800 then moves to a problem detection module 818 before proceeding to block 802. Similarly, if the evaluation at block 814 finds that the network has good SD capability but questionable HD capability, the test 800 recognizes at a block 820 that the network has problems before proceeding to the problem detection module 818 and continuing to block 802.

If, however, the evaluation performed at block 814 determines that the network's SD and HD capabilities are sufficient, the test 800 proceeds to a block 822 where it is evaluated if the test 800 is happening on startup. In the event that it is, the test 800 continues to a block 824, where the test 800 may either be directed back to the main module 804, or looped by returning to block 804. Alternately, if block 822 is not satisfied, then test 800 continues to block 826 where a bandwidth monitor module 828 may be reached, or the test 800 may be concluded by returning to block 802.

Figure 9:
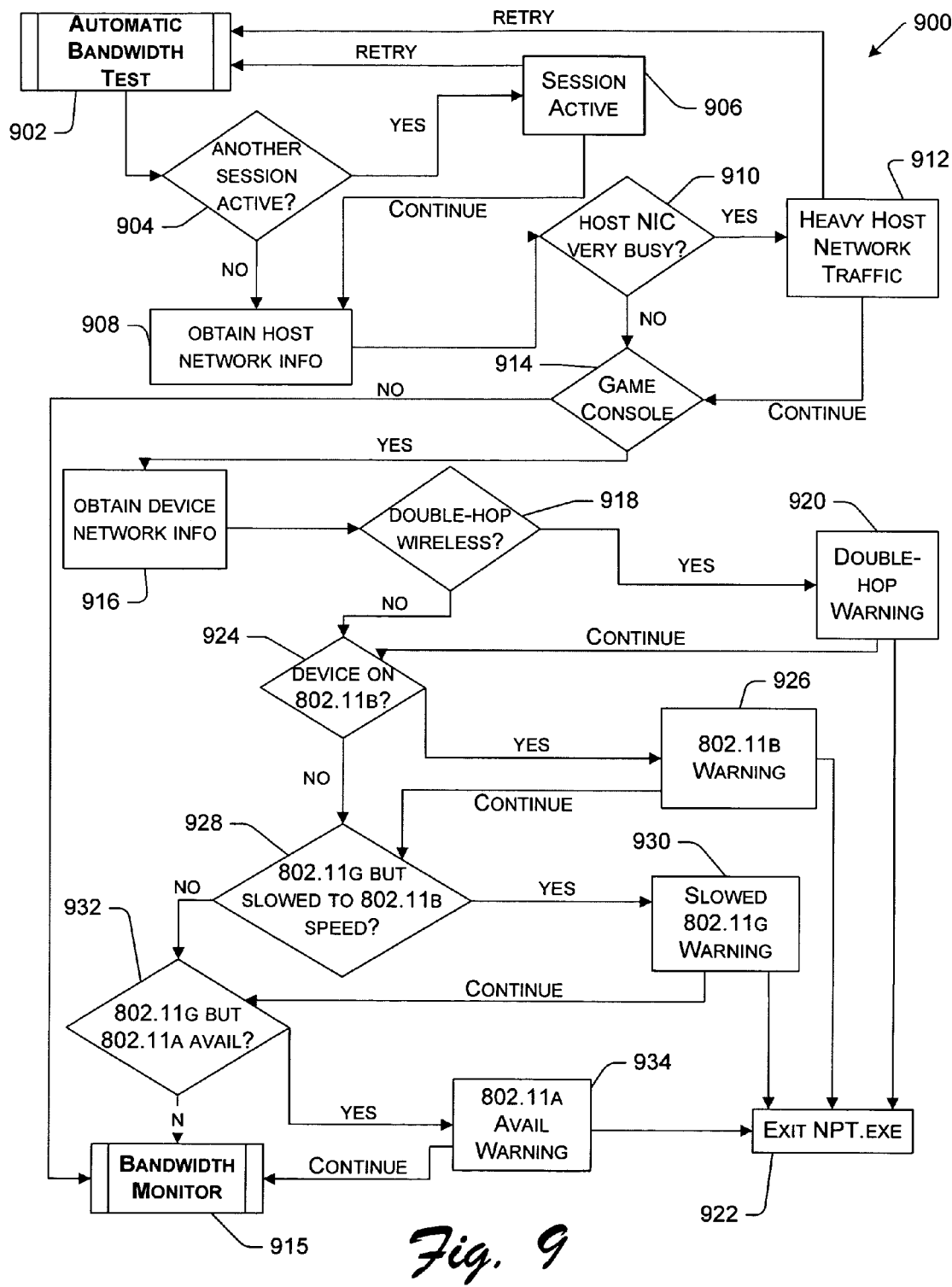
FIG. 9 is a flow diagram of a problem detection method.

FIG. 9 illustrates a possible problem detection method 900 which is fed by an automatic bandwidth test module 902, such as, for example, that discussed above in conjunction with FIG. 8. Initially, at a block 904 the method 900 queries to see if another session is active on the network. If so, at a block 906 the method may issue an alert and allow the user to either return to block 902, or continue to a block 908 and obtain information about the host network. Alternately, if at block 904 it is determined that another session is not active, the method 900 proceeds directly to block 908. If the host NIC is very busy, then this is recognized at a block 910 and the method 900 issues a heavy host traffic alert at a block 912 and allows the user to either return to the automatic bandwidth test module or continue to a block 914. If the host NIC is not busy, however, the method 900 proceeds directly to block 914 where the game console 120 is evaluated for its readiness to participate on the network. If the game console 120 is not ready, then the method 900 continues to a bandwidth monitor module 915. Alternately, if the game console 120 is ready, then the method 900 obtains device information at a block 916. If the device is determined to be a double hop wireless at a block 918, then a double hop warning is issued at a block 920, and the method 900 may either finish at a block 922, or the user may elect to proceed to block 924 where it is determined whether or not the wireless system is configured to the IEEE 802.11b standard. Alternately, if it is determined at block 918 that a double hop wireless is not being used, the method 900 proceeds directly to block 924.

At block 924, if it is found that the device is configured to the IEEE 802.11b standard, then a 802.11b warning is issued at block 926 and the method 800 may either be allowed to finish at a block 922, or the user may elect to continue to block 928 where it is determined if the device is actually an IEEE 802.11g device slowed to IEEE 802.11b speed. Alternately, if it is determined at block 924 that the device is configured to the IEEE 802.11b standard, the method 900 proceeds directly to block 928.

At block 928, if it is found that the device is actually an IEEE 802.11g device, a slowed 802.11g warning is issued at a block 930 and the method 900 may either be concluded at a block 922 or continued to a block 932. Alternately, if it is determined at block 928 that the device is not an IEEE 802.11g device, then the method proceeds directly to block 932 where an evaluation is performed to see if an IEEE 802.11a device is available. If no, then the method 900 proceeds to a bandwidth monitor module 915. If yes, then the method 900 issues a 802.11a availability warning at a block 934 and either finishes by proceeding to block 922, or continues to the bandwidth monitor module 915.

Figure 10:
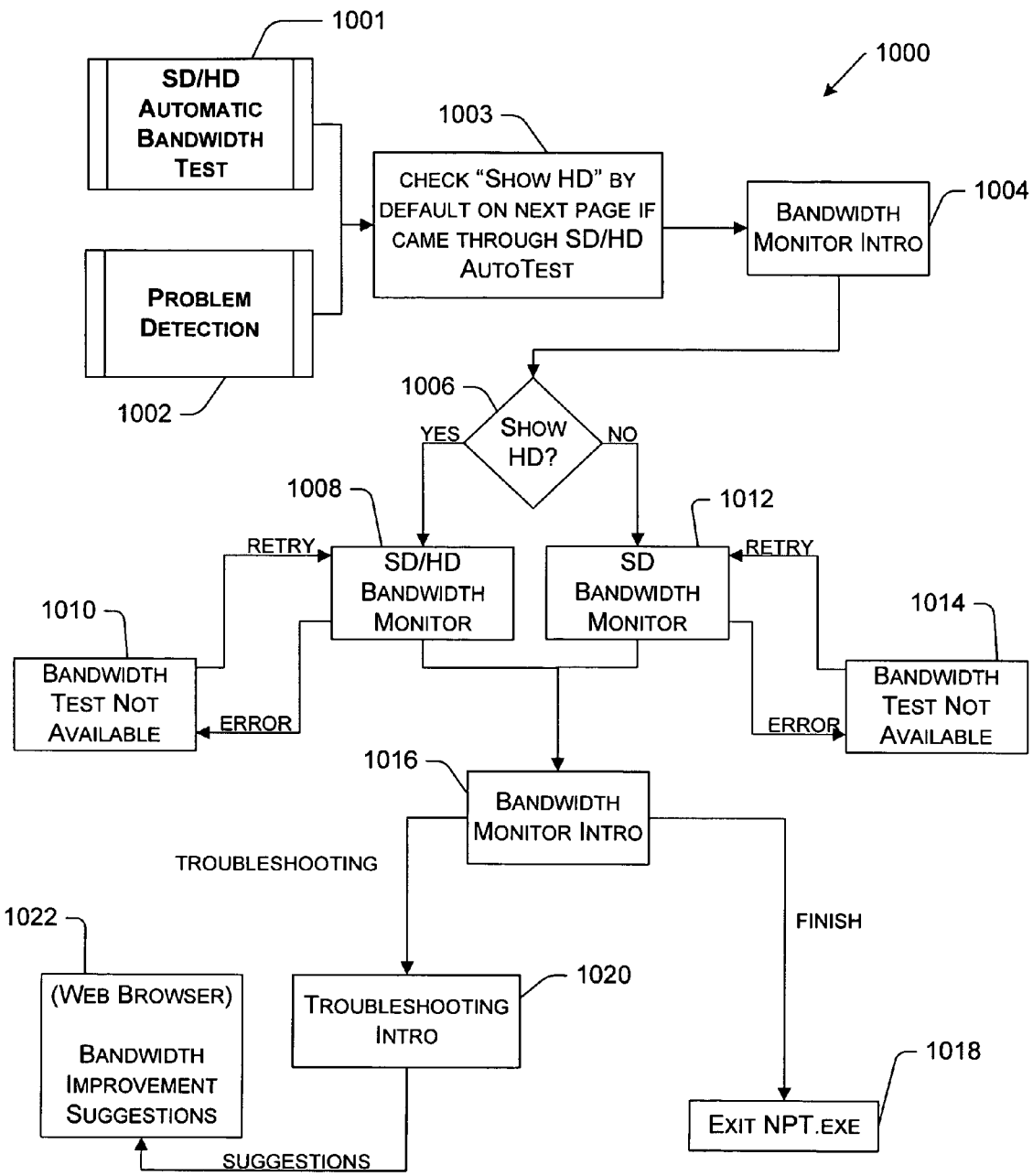
FIG. 10 is a flow diagram of a bandwidth monitoring method.

FIG. 10 illustrates a bandwidth monitor method 1000 contained in an exemplary bandwidth monitor module fed by a SD/HD automatic bandwidth test module 1001 and a problem detection module 1002. The bandwidth monitor method 1000 begins at a block 1003 where it is checked to see if an affirmative response (e.g. "show HD") was received from a SD/HD Automatic bandwidth test. At a block 1004 a bandwidth monitor intro may be displayed before proceeding to block 1006. If at block 1006 it is discovered that an affirmative response was received from the SD/HD automatic bandwidth test, then an SD/HD monitor is presented at a block 1008. This is looped with a block 1010 which displays that a bandwidth test is not available in the event there is an error. Alternately, if no such show HD signal was received, then a SD Bandwidth Monitor is displayed at a block 1012. In a fashion similar to that of block 1008, a loop exists between block 1012 and a block 1014 which displays that a bandwidth test is not available in the event there is an error.

Blocks 1008 and 1012 can both feed into a block 1016 in which a bandwidth monitor introduction is displayed. From here users may elect to terminate the method 1000 and proceed to a block 1018, or they may opt to troubleshoot their network by proceeding to a block 1020 where suggestions to this effect might be offered. In addition, bandwidth improvement suggestions may also be offered via a web browser at a block 1022.

Figure 11:
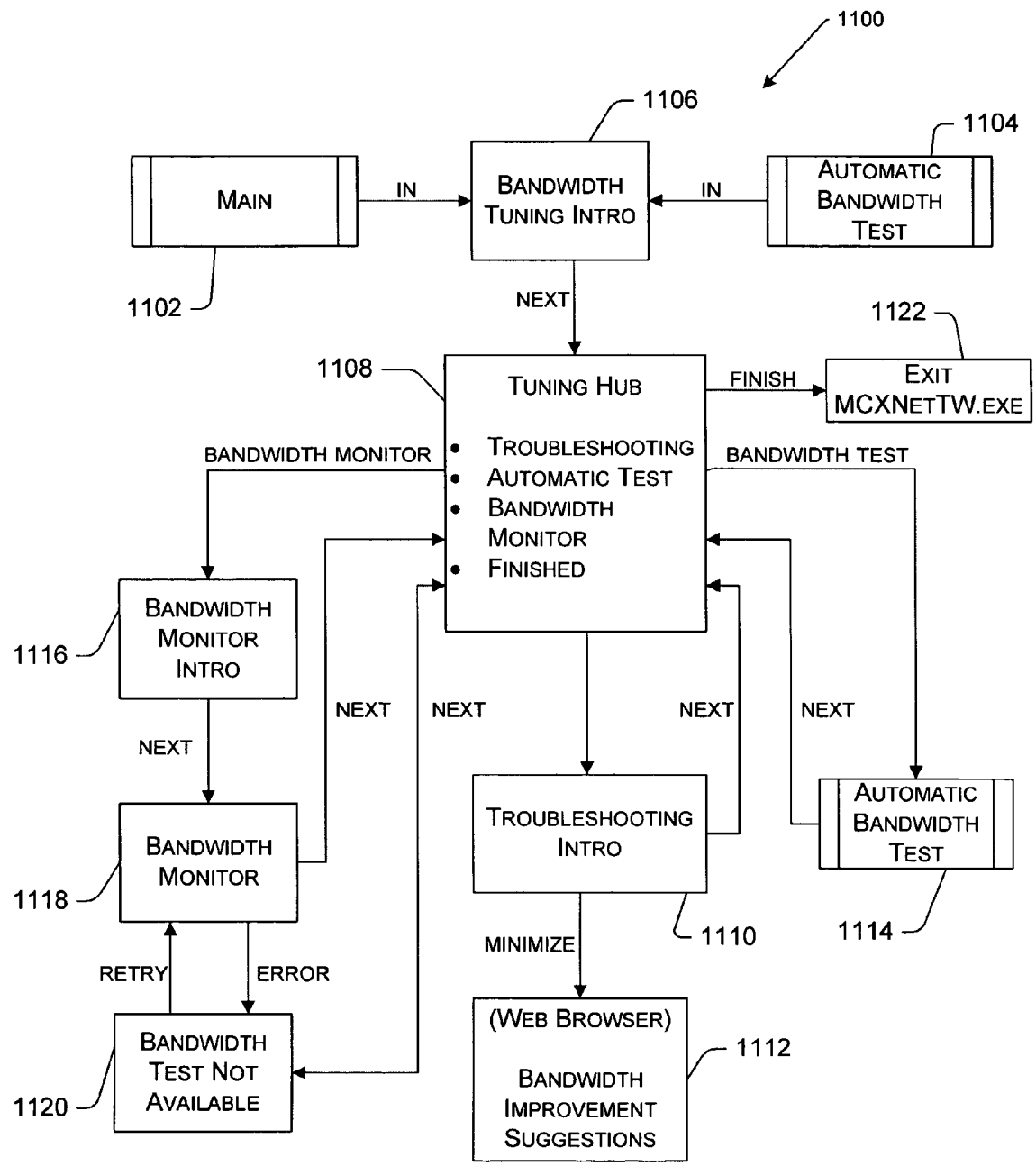
FIG. 11 is a flow diagram of a tuning hub method.

FIG. 11 illustrates an exemplary tuning hub method 1100 which is fed by a main module 1102 and an automatic bandwidth test module 1104. The tuning hub method 1100 commences at a block 1106 where a bandwidth tuning introduction may be displayed before proceeding to a block 1108 where a plurality of options are offered to a user. For example, one prompt offers the user the opportunity to troubleshoot. If chosen, this leads the method 1100 to a block 1110 which displays a troubleshooting introduction and leads further to block 1112 in which bandwidth improvement suggestions are displayed via a web browser. When finished the user can choose to return to block 1108.

Alternately, the user may choose to follow a prompt at block 1108 offering bandwidth test services. If chosen, the method 1100 proceeds to an automatic bandwidth test module 114, before returning to block 1108 upon completion of the test.

Another option available to the user at block 1108 is that of a bandwidth monitor. When selected, the method 1100 proceeds to a block 1116 which displays a bandwidth monitor introduction. Subsequently, a bandwidth monitor is displayed at a block 1118. In the event of error, a block 1120 is displayed giving the user the opportunity to retry block 1118. When the user is satiated (either at block 1118 or block 1120) they may choose to return to block 1108.

Another option presented to the user at block 1108 is that of finishing. When the user chooses this alternative, the method 1100 proceeds to block 1122 where the program 1100 is concluded.

Figure 12:
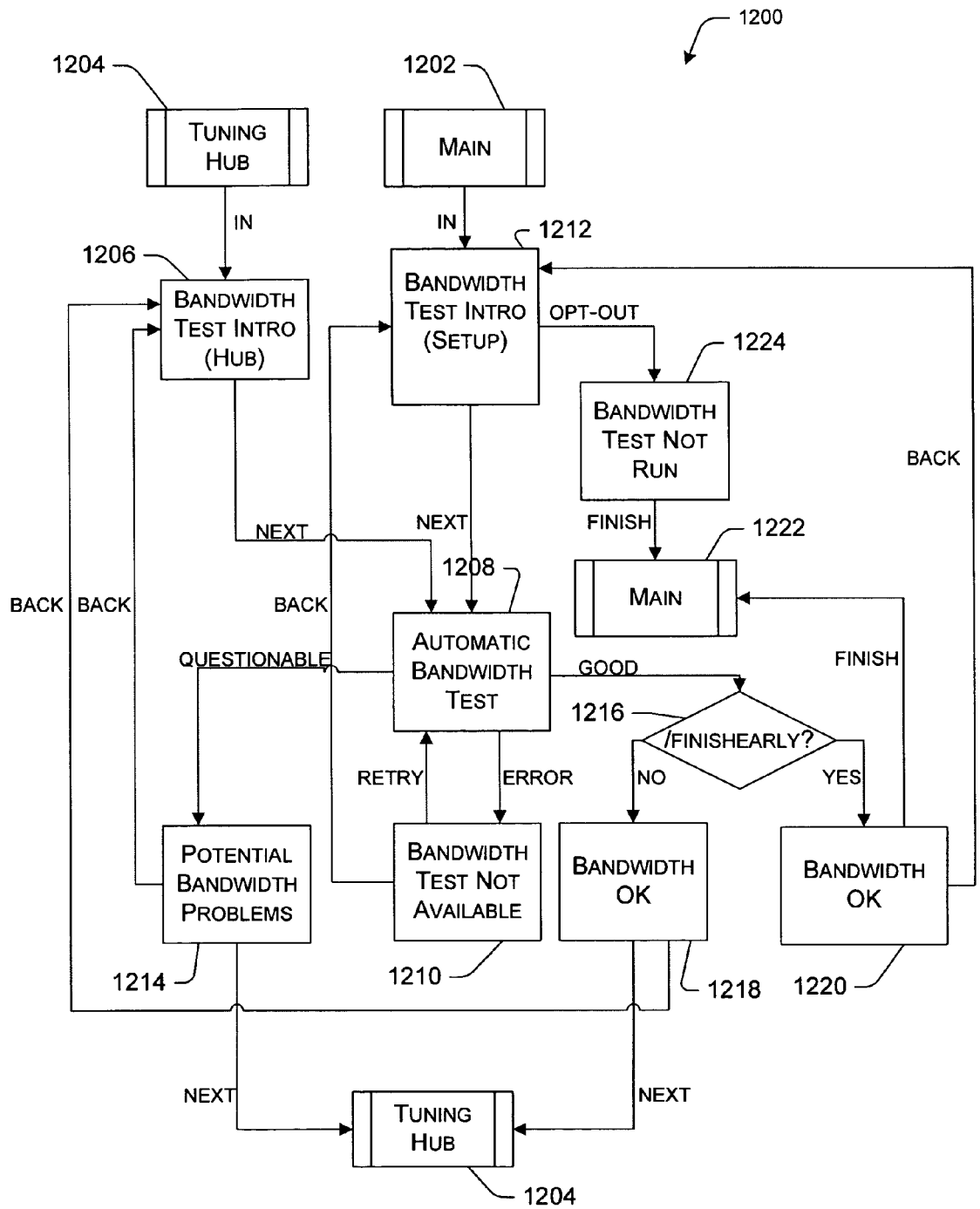
FIG. 12 is a flow diagram of an automatic network bandwidth test.

FIG. 12 illustrates an exemplary auto test method 1200 which is fed by a main module 1202 and a tuning hub module 1204. Looking at the tuning hub module feeder 1204, the method 1200 commences at a block 1206 which displays a bandwidth test introduction before proceeding to a block 1208 where an automatic bandwidth test is displayed. In the event of error, the method 1220 proceeds to a block 1210 where it is displayed that a bandwidth test is not available and the user is given the option to return to block 1208 or continue to a bandwidth test introduction at a block 1212. Alternately, if the bandwidth found at block 1208 is determined to be questionable, the method 1200 proceeds to a block 1214 where potential bandwidth problems are displayed. From here the user may elect to either proceed to a tuning hub module 1204 or return to the bandwidth test introduction at block 1206.

If the bandwidth found at block 1208 is determined to be good, the method 1200 proceeds to a block 1216 where it is decided if the method 1200 should finish early. If no, the method 1200 proceeds to a block 1218 where it is displayed that the bandwidth is ok, and the user is given the option to either continue to the tuning hub 1204 or return to the bandwidth test introduction at block 1206.

If the decision is made at block 1216 to finish early, the method 1200 proceeds to a block 1220 where it is displayed that the bandwidth is ok, and the user is given the option to finish by proceeding to a main module 1222 or proceed to the bandwidth test introduction at block 1212.

Looking at the main module feeder 1202, the method 1200 commences at a block 1212 where a bandwidth test introduction is displayed and users are given the opportunity to opt out and proceed to a block 1224 where it is displayed that a bandwidth test has not been run and the method is guided to the main module 1222. At block 1212 the user is also given the opportunity to proceed to block 1208 where an automatic bandwidth test is displayed. In the event of error, the method 1200 proceeds to a block 1210 where it is displayed that a bandwidth test is not available and the user is given the option to return to block 1208 or return to the bandwidth test introduction at block 1212. Alternately, if the bandwidth found at block 1208 is determined to be questionable, the method 1200 proceeds to a block 1214 where potential bandwidth problems are displayed. From here the user may elect to either proceed to a tuning hub module 1204 or proceed to the bandwidth test introduction at block 1206.

If the bandwidth found at block 1208 is determined to be good, the method 1200 proceeds to a block 1216 where it is decided if the method 1200 should finish early. If no, the method 1200 proceeds to a block 1218 where it is displayed that the bandwidth is ok, and the user is given the option to either continue to the tuning hub 1204 or proceed to the bandwidth test introduction at block 1206.

If the decision made at block 1216 is to finish early, the method 1200 proceeds to a block 1220 where it is displayed that the bandwidth is ok, and the user is given the option to finish by proceeding to a main module 1222 or proceed to the bandwidth test introduction at block 1212.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. Computer-readable media residing on a game console having a first set of computer-readable instructions that, when executed by a processor, implement a method comprising:
   loading a second set of computer-readable instructions from a computer storage media to reconfigure receiver-side aspects of the game console for receipt of high definition transmissions from a tuner over a home network connection between the tuner and the game console;
   calling a third set of computer-readable instructions residing on a remote device coupled to the game console over the home network connection, the third set of computer-readable instructions being configured to evaluate available bandwidth of the home network connection for transmitting the high definition transmissions;
   providing, by the third set of computer-readable instructions, information to improve a throughput of the home network connection to enable receipt of the high definition transmissions by the game console when the available bandwidth is deemed inadequate; and
   evaluating, by the third set of computer-readable instructions, the available bandwidth of the home network connection during reception of the high definition transmissions by the game console to perform an action to improve throughput when the available bandwidth becomes inadequate.

2. The computer-readable media of claim 1, wherein the third set of computer-readable instructions implements a user-interface component that provides historical throughput information in comparison with an acceptable performance target.

3. The computer-readable media of claim 1, wherein the third set of computer-readable instructions includes one of:
   a static document including suggested actions to improve the throughput of the network; or
   a link to an updatable document located on an accessible source including suggested actions to improve the throughput of the network.

4. The computer-readable media of claim 1, wherein the third set of computer-readable instructions is executed on the remote device.

5. The computer-readable media of claim 1, wherein the second set of computer-readable instructions reconfigures data reception properties of the game console to prioritize data packets carrying media content.

6. The computer-readable media of claim 1, wherein the second set of computer-readable instructions is further configured to enable the storage of high definition transmissions.

7. The computer-readable media of claim 1, wherein the second set of computer-readable instructions is further configured to implement in the game console receiver-side admission control and quality of service (QoS) packet tagging procedures.

8. The computer-readable media of claim 1, wherein the second set of computer-readable instructions is further configured to enable an architecture to handle live streaming of high definition content.

9. The computer-readable media of claim 1, wherein:
   the first set of instructions is a bootloader program code resident in the computer-readable medium residing on a game console;
   the loading the second set of computer-readable instructions from the computer storage media further comprises loading, by the bootloader program, a high definition enablement program code from an optical storage media located in an optical disc reader of the game console; and
   the third set of instructions is a network tuning program resident on a computing device in communication with the game console over the home network connection.

10. A method comprising:
    loading, by a game console processor, a first set of computer-readable instructions from computer storage media, the first set of computer-readable instructions reconfiguring receiver-side aspects of the game console of the game console for receipt of high definition transmissions from a tuner over a home network connection;
    calling a second set of computer-readable instructions stored on a computer storage media in communication with the game console; and
    evaluating, by the second set of computer-readable instructions, the home network connection to determine available bandwidth for transmitting the high definition transmissions, the second set of computer-readable instructions providing instructions to improve a throughput of the home network connection when the available bandwidth is deemed inadequate.

11. The method as recited in claim 10, further comprising evaluating, by the second set of instructions, the available bandwidth of the home network connection during reception of the high definition transmissions by the game console to perform an action to improve throughput when the available bandwidth becomes inadequate.

12. The method as recited in claim 10, wherein the second set of computer-readable instructions includes a user-interface component that provides historical throughput information in comparison with an acceptable performance target.

13. The method as recited in claim 10, wherein the first set of computer-readable instructions reconfigures data reception properties of the game console to prioritize data packets carrying media content.

14. The method as recited in claim 10, wherein the first set of computer-readable instructions is further configured to implement in the game console receiver-side admission control and quality of service (QoS) packet tagging procedures.

15. The method as recited in claim 10, wherein:
  the first set of computer-readable instructions is loaded by a bootloader program code resident in a memory residing on the game console;
  the loading, by the game console, the first set of computer-readable instructions from the computer storage media further comprises loading, by the bootloader program, a high definition enablement program code from an optical storage media located in an optical disc reader of the game console; and
  the second set of instructions is a network tuning program resident on a computing device in communication with the game console over the home network connection.

16. Computer-readable media residing on a game console having a first set of computer-readable instructions that, when executed by a processor, implement operations comprising:
  accessing a second set of computer-readable instructions stored on computer storage media, the second set of computer-readable instructions reconfiguring data reception properties of the game console for receipt of high definition transmissions from a tuner over a home network connection;
  accessing a third set of computer-readable instructions residing on a remote device coupled to the game console over the home network connection, the third set of computer-readable instructions being configured to evaluate the home network connection for transmitting the high definition transmissions; and
  providing, by the third set of computer-readable instructions, information to improve a throughput of the home network connection to enable receipt of the high definition transmissions by the game console.

17. The computer-readable media of claim 16, further comprising evaluating, by the third set of instructions, available bandwidth of the home network connection during reception of the high definition transmissions by the game console to perform an action to improve throughput when the available bandwidth becomes inadequate.

18. The computer-readable media of claim 16, wherein the second set of computer-readable instructions reconfigures the data reception properties of the game console to prioritize data packets carrying media content.

19. The computer-readable media of claim 16, wherein the second set of computer-readable instructions is further configured to implement in the game console receiver-side admission control and quality of service (QoS) packet tagging procedures.

20. The computer-readable media of claim 16, wherein:
  the first set of instructions is a bootloader program code resident in the computer-readable medium residing on a game console;
  the accessing the second set of computer-readable instructions from the computer storage media further comprises accessing, by the bootloader program, a high definition enablement program code from an optical storage media located in an optical disc reader of the game console; and
  the third set of instructions is a network tuning program resident on a computing device in communication with the game console over the home network connection.

* * * * *

UNITED STATES PATENT AND TRADEMARK OFFICE
CERTIFICATE OF CORRECTION

| | | |
|---|---|---|
| PATENT NO. | : 7,878,907 B2 | Page 1 of 1 |
| APPLICATION NO. | : 11/128573 | |
| DATED | : February 1, 2011 | |
| INVENTOR(S) | : Davis et al. | |

It is certified that error appears in the above-identified patent and that said Letters Patent is hereby corrected as shown below:

In column 1, line 21, after "and" delete "as".

Signed and Sealed this

Sixteenth Day of August, 2011

David J. Kappos
*Director of the United States Patent and Trademark Office*